United States Patent Office.

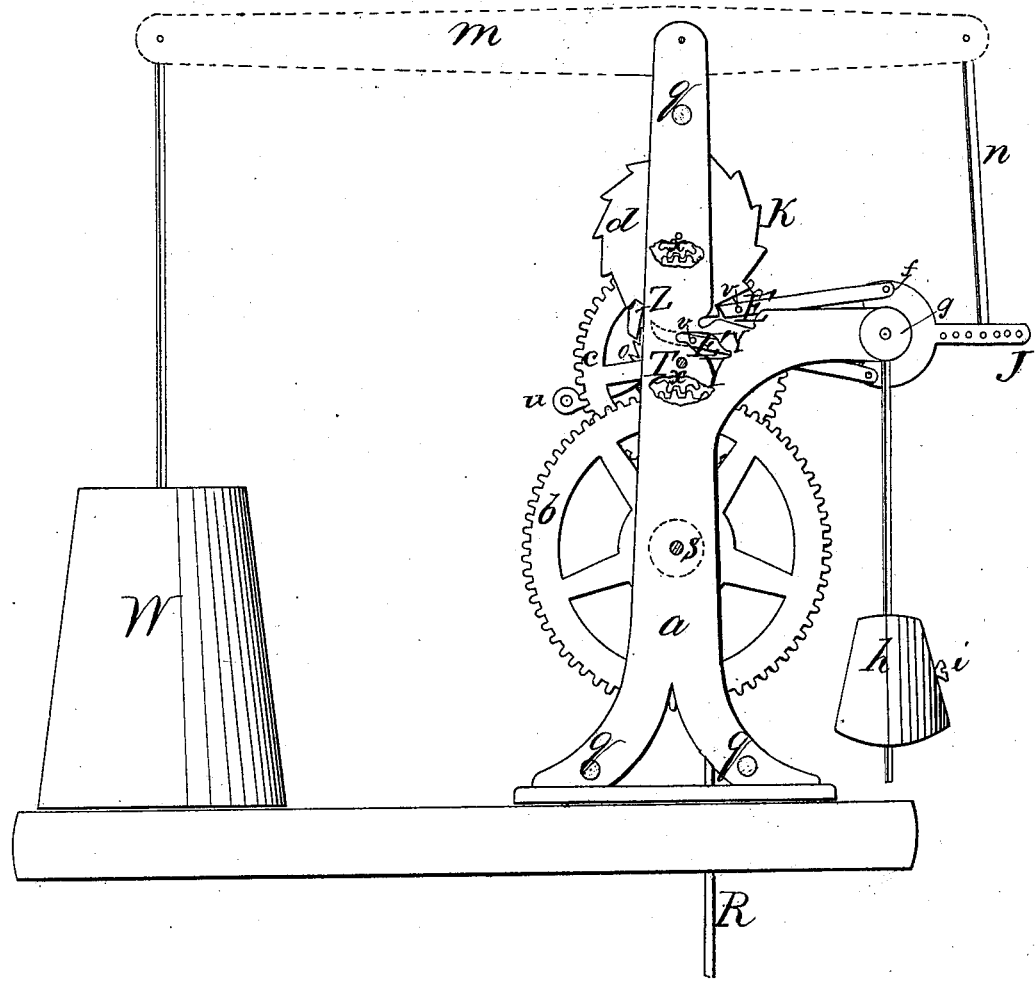

CHARLES P. CARTER, OF POUGHKEEPSIE, NEW YORK.

*Assignor to self and Norris M. Carter of the same place.*

Letters Patent No. 77,167, dated April 28, 1868.

---

IMPROVED MECHANICAL POWER.

---

*The Schedule referred to in these Letters Patent and making part of the same.*

---

TO ALL WHOM IT MAY CONCERN:

Be it known that I, CHARLES P. CARTER, of Poughkeepsie, in the county of Dutchess, and State of New York, have invented a new and improved Mechanical Power; and I do hereby declare that the following is a full, clear, and exact description, reference being had to the annexed drawings, forming a part of this specification.

The nature of my invention consists in providing a framework to carry a suitable number of wheels, three in number, and two pinions, properly arranged, and by attaching a heavy weight so as to set them in motion.

I am able by my invention to control the motion of said wheels and weight, so as to obtain a cheap power for churning and other uses, and cause it to run a suitable length of time to churn cream or milk into butter, and afford ample power.

In the accompanying plate of drawings, my improvement in churning is illustrated, in which I show a machine with a churn attached.

Similar letters of reference indicate like parts.

$a$ represents the frame, which can be made of iron or wood. $b$ is the driving-wheel, to the shaft of which I wind the cord R, to which the weight is attached. The weight is lifted by turning the crank, seen at $u$, which is placed upon one end of the shaft of wheel $c$, which is seen at T. The weight is held by the click $z$ and ratchet $o$. The frame is represented broken through to show the pinions $x\,x$. Wheel $d$ has teeth with a broad base, and a curved or angular front, as seen at K. The object of this curved front is to allow the pawls E E a good hold of the teeth, and at the same time allow of their being easily detached from the tooth which is impelling it forward. The pawls E E are jointed to flange $f$ by a pin. Flange $f$ is formed, as shown, with the projecting arm J, in which is a series of graduating holes, as shown, to allow the pitman $n$ to be placed nearer the shaft at $g$, or farther out at J, to give a longer or shorter motion to arms $m$. The pawls E E have inserted in them a pin, as seen at E E. This pin, when the machine is at rest, drops upon the cam-shaped guides Y Y made in the frame, and supports the pawls, and brings each pawl against a tooth of the wheel $d$ at the proper time. The pendulum-weight $h$ is placed upon a rod which is attached to shaft at $g$. This weight is kept upon the rod by screw $i$. The object of pendulum is, by its velocity or force when in motion, to release one of the pawls E E from the wheel $d$, as will be shown, and also to control the motion of wheels $b$, $c$, and $d$. The dotted line at S represents the spool upon which the cord is wound. $q\,q\,q$ are studs, which hold the frame $a$. W, the churn.

The machine, when at rest, and both pawls E E are resting on a tooth of wheel $d$, could not start, however much power were applied to it, but if a little motion is applied to ball $h$, it causes one of the pawls E E to drop, and pin, seen at E, rests upon guide Y, and is brought up again to be caught by the coming tooth, and so on, one pawl causing the release of its mate alternately, and the machine is kept in motion.

The motion of the pawls is communicated to flange $f$ giving it an oscillating or vibratory motion, which carries arm J up and down, carrying the pitman $n$, which is attached with it, and giving the ball $h$ a swinging motion, and sufficient force to release the pawls, and the machine is kept in motion.

What I claim as my invention, and desire to secure by Letters Patent, is—

1. The wheel $d$, with teeth, formed as shown and described, in combination with pawls E E, for imparting motion to flange $f$ and arm J, in the manner shown and described.

2. The ball $h$, when arranged and combined with shaft $g$ and flange $f$ and pawls E E, substantially the same as shown, and for the purpose set forth.

C. P. CARTER.

Witnesses:
   EDWD. BLANKENHORN,
   JOHN HOPKINS.